US008423030B2

(12) United States Patent
George et al.

(10) Patent No.: US 8,423,030 B2
(45) Date of Patent: Apr. 16, 2013

(54) USER PROFILES

(75) Inventors: Richard John George, Waterloo (CA); Zhigang Ruan, Waterloo (CA); Brian Alexander Oliver, Fergus (CA)

(73) Assignee: Research In Motion Limited, Waterloo (CA)

( * ) Notice: Subject to any disclaimer, the term of this patent is extended or adjusted under 35 U.S.C. 154(b) by 158 days.

(21) Appl. No.: 12/830,973

(22) Filed: Jul. 6, 2010

(65) Prior Publication Data

US 2012/0009929 A1 Jan. 12, 2012

(51) Int. Cl.
*H04W 40/00* (2009.01)

(52) U.S. Cl.
USPC ........ 455/445; 455/448; 455/560; 455/456.3; 455/456.1

(58) Field of Classification Search .................. 455/445, 455/448, 560, 456.3, 456.1
See application file for complete search history.

(56) References Cited

U.S. PATENT DOCUMENTS

| | | | |
|---|---|---|---|
| 6,522,884 | B2 | 2/2003 | Tennison |
| 7,412,236 | B1 | 8/2008 | Blight et al. |
| 7,447,779 | B2 | 11/2008 | Fuji |
| 2003/0214940 | A1 | 11/2003 | Takken |
| 2004/0012576 | A1 | 1/2004 | Cazier |
| 2004/0242240 | A1* | 12/2004 | Lin ............................ 455/456.3 |
| 2005/0091357 | A1 | 4/2005 | Krantz |
| 2005/0195954 | A1* | 9/2005 | Klein et al. ............... 379/201.04 |
| 2006/0023657 | A1* | 2/2006 | Woodson et al. ............. 370/328 |
| 2006/0205436 | A1* | 9/2006 | Liu et al. ........................ 455/560 |
| 2006/0282554 | A1* | 12/2006 | Jiang et al. ........................ 710/14 |
| 2009/0017865 | A1* | 1/2009 | Cole et al. ................... 455/552.1 |
| 2009/0215438 | A1* | 8/2009 | Mittal et al. ................... 455/418 |
| 2010/0189236 | A1* | 7/2010 | MacDonald ............. 379/142.04 |

FOREIGN PATENT DOCUMENTS

| | | |
|---|---|---|
| EP | 1713234 | 2/2006 |
| GB | 2398204 | 4/2003 |
| WO | 2005041460 | 5/2005 |

OTHER PUBLICATIONS

European Search Report dated Feb. 3, 2011. In corresponding application No. 10168556.8.
Examination Report dated Jun. 2, 2011. In corresponding application No. 10168556.8.

* cited by examiner

*Primary Examiner* — Barry Taylor
(74) *Attorney, Agent, or Firm* — Novak Druce Connolly Bove + Quigg LLP

(57) ABSTRACT

A method, system and computer-readable product for a fixed mobile convergence system. The method includes analyzing at least one rule set associated with at least one user profile with the user profile being associated with at least one mobile device supporting more than one line. Each line offering one or more transports and options for establishing a telephone call. After analyzing the one or more rule sets, a context-specific real-time usage mode is determined based on the analysis which include selections of a telephone line, a transport and establishment options. After determining the usage mode, a call is established between one of the devices and a telephony endpoint, either incoming or outgoing, based on the determined usage mode.

19 Claims, 6 Drawing Sheets

| DEFAULT LINE & CALL CONTROL POLICY |||
|---|---|---|
| TYPE | RULE | OVERRIDE |
| Line | Work Line Preferred (Mobile Prompt) | Yes |
| Transport | VoWLAN Preferred | No |
| WLAN | VoWLAN is enabled on the following WLAN Profiles (work) | No |
| | Enable Private WLAN Profile | |
| | | No |
| Direction | Enterprise calls the Second Device for incoming call on HPLMN | No |
| | Second Device calls the Enterprise for outgoing calls on HPLMN | No |
| | Enterprise calls the Second Device for incoming call on VPLMN | No |
| | Second Device calls the Enterprise for outgoing calls on VPLMN | No |
| | No Second Device data support is not available | No |
| Time of Day | Outgoing calls use second line on Saturday and Sunday | Yes |
| | Outgoing calls use second line before 8AM & after 5PM, M-F | Yes |
| | Incoming calls to voicemail on Saturday and Sunday | Yes |
| | Incoming calls use second line before 8AM & after 5PM, M-F | Yes |
| Call Restrictions | Allowed – all | Yes |
| | Blocked – None | Yes |
| | Unknown caller - allowed | No |

FIG. 6

| PRIVATE ADDITIONAL LINE & CALL CONTROL POLICY |||
|---|---|---|
| TYPE | RULE | OVERRIDE |
| Line | Cellular line only | No |
| Transport | Not available | No |
| WLAN | Not available | No |
| Direction | Not available | No |
| Time of Day | Not available | No |
| Call Restrictions | Allowed – by contact | |
| | Blocked – All | No |
| | Unknown caller – not allowed | |

FIG. 7

| OUT OF HOURS ADDITIONAL LINE & CALL CONTROL POLICY |||
|---|---|---|
| TYPE | RULE | OVERRIDE |
| Line | Work line preferred, fall back to cellular only after prompting | No |
| Transport | As default | No |
| WLAN | As default | No |
| Direction | As default | No |
| Time of Day | Outgoing calls use work line always | No |
| Call Restrictions | As default | No |

FIG. 8

USER PROFILES

FIELD OF THE TECHNOLOGY

The present disclosure relates generally to an enterprise fixed mobile convergence system. More specifically, the present disclosure relates to an enterprise fixed mobile convergence system which analyzes user profiles to choose a phone line, transport, and direction for incoming and outgoing calls.

BACKGROUND

Enterprise fixed mobile convergence systems are becoming more prevalent. One of the benefits of such systems is the convenience of having one work phone number and one voice mailbox for a user while having the possibility of multiple actual phones, for example, a "work" phone device and a "mobile" device allowing for a single work persona for incoming and outgoing call regardless of the actual location of the user. The work phone device is typically a fixed phone that a worker can use in the office and the mobile device is a handheld electronic device, such as a cell phone or a personal digital assistant (PDA) that is capable of handling phone calls, emails and text messages. The mobile device may already have a number allocated by the cellular carrier associated with it, in which case the work FMC number becomes a second line on that mobile device. The mobile device may use traditional cellular technology to establish a call, for example, enhanced data GSM environment (EDGE) or code division multiple access (CDMA), or the call may be placed over a voice over internet protocol (VoIP) connection either using cellular or wireless local access network (WLAN) technology, for example, Wi-Fi 802.11 or WiMAX 802.16. Although a user can use either number on the mobile device, a company may prefer that one number be used over the other. Similarly, the company may prefer one transport technology over another. For example, if the user is in the office, the company may prefer that all business calls are on the work number and are through VoIP rather than Cellular. In addition, the user may have preferences in how the mobile device is utilized, for example, using the cellular line for friends and family, but an Enterprise FMC line for work-related calls.

BRIEF DESCRIPTION OF THE DRAWINGS

FIG. 6 is a table for the Default Line and Call Control Policy in accordance with an exemplary implementation;

FIG. 7 is a table for a Private Additional Line and Call Control Policy in accordance with an exemplary implementation;

FIG. 8 is a table for an Out of Hours Additional Line and Call Control Policy in accordance with an exemplary implementation.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology. Other aspects of the present technology will be apparent to those of ordinary skill in the art from a review of the following detailed description in conjunction with the drawings. Implementations of the present technology are not limited to any particular operating system, mobile device architecture, server architecture, or computer programming language.

The present technology relates to the control and management of communications. Although reference may be made to "calls" in the description of example implementations below, it will be appreciated that the described systems and methods are applicable to session-based communications in general and not limited to voice calls. It will also be appreciated that the systems and methods may not be limited to sessions and may be applicable to messaging-based communications in some implementations.

Figure 1:
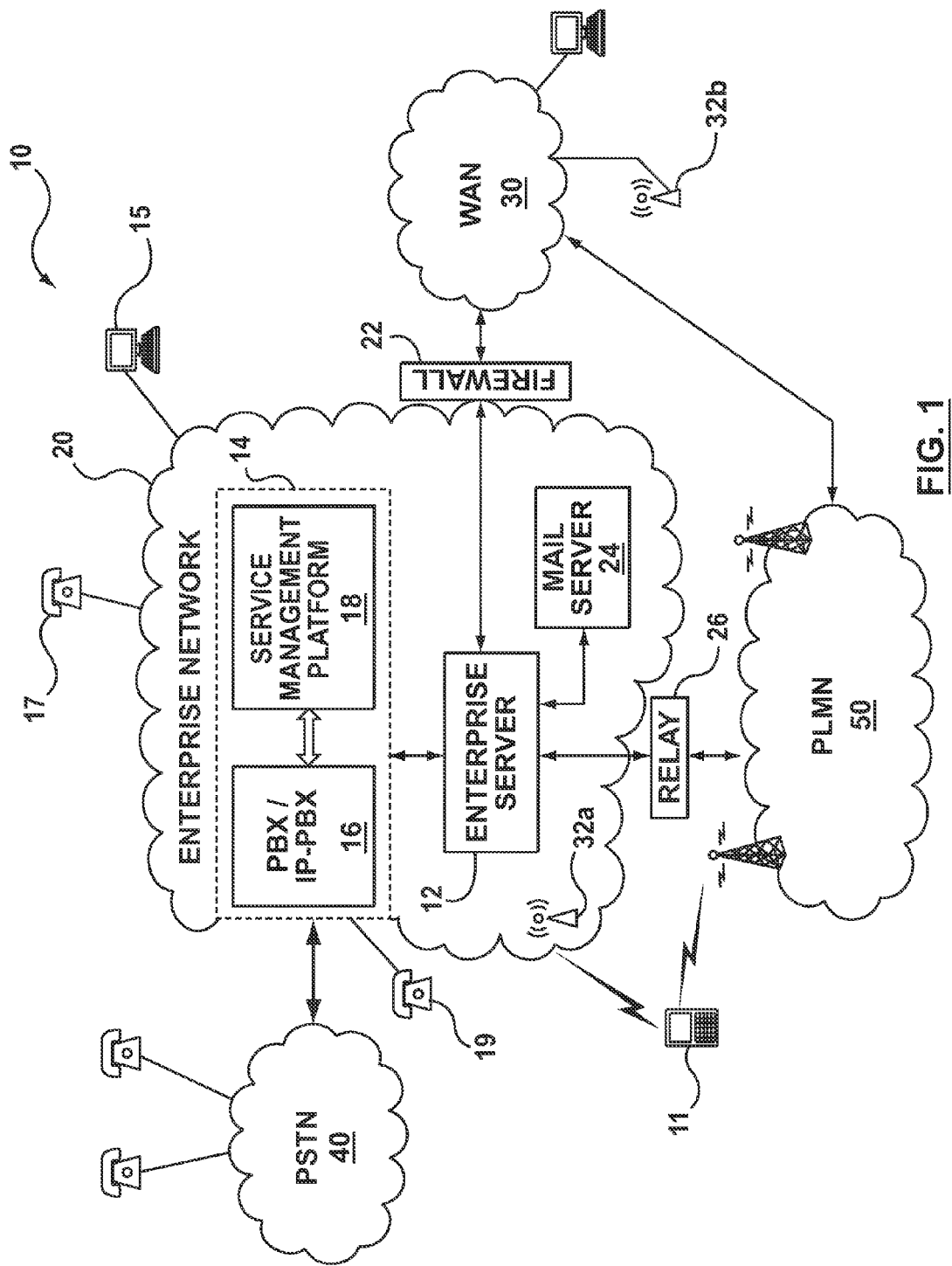
FIG. 1 is a block diagram of a system for managing enterprise-related mobile calls, including an enterprise communications platform in accordance with an exemplary implementation.

Reference is now made to FIG. 1, which shows, in block diagram form, an example system, generally designated 10, for the control and management of communications. The system 10 can include an enterprise or business system 20, which in many implementations can include a local area network (LAN). In the description below, the enterprise or business system 20 can be referred to as an enterprise network 20. It will be appreciated that the enterprise network 20 can include more than one network and can be located in multiple geographic areas in some implementations.

The enterprise network 20 can be connected, often through a firewall 22, to a wide area network (WAN) 30, such as the Internet. The enterprise network 20 can also be connected to a public switched telephone network (PSTN) 40 via direct inward dialing (DID) trunks or primary rate interface (PRI) trunks. In some cases the Enterprise can connect directly with a public land mobile network (PLMN) 50 for circuit switched calls to mobile devices.

The enterprise network 20 can also communicate with a public land mobile network (PLMN) 50, which can also be referred to as a wireless wide area network (WWAN) or, in some cases, a cellular network, for packet switched communications. The connection with the PLMN 50 can be made via a relay 26, as known in the art.

The enterprise network 20 can also provide a wireless local area network (WLAN) 32a featuring wireless access points. Other WLANs 32 can exist outside the enterprise network 20. For example, WLAN 32b can be connected to WAN 30.

The system 10 can include a number of enterprise-associated mobile devices 11 (only one shown). The mobile devices 11 can include devices equipped for cellular communication through the PLMN 50, mobile devices equipped for Wi-Fi communications over one of the WLANs 32, or dual-mode devices capable of both cellular and WLAN communications. WLANs 32 can be configured in accordance with one of the IEEE 802.11 specifications.

It will be understood that the mobile devices 11 can include one or more radio transceivers and associated processing hardware and software to enable wireless communications with the PLMN 50 and/or one of the WLANs 32. In various implementations, the PLMN 50 and mobile devices 11 can be configured to operate in compliance with any one or more of a number of wireless protocols, including GSM, GPRS, CDMA, EDGE, UMTS, EvDO, HSPA, LTE, or a variety of others. It will be appreciated that the mobile device 11 can roam within the PLMN 50 and across PLMNs, in known manner, as the device moves. In some instances, the dual-mode mobile devices 11 and/or the enterprise network 20 can be configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically can include a number of networked servers, computers, and other devices. For example, the enterprise network 20 can connect one or more desktop or laptop computers 15 (one shown). The connection can be wired or wireless in some implementations. The enterprise network 20 can connect to one or more digital telephone sets 17 (one shown).

The relay 26 can serve to route messages received over the PLMN 50 from the mobile device 11 to the corresponding enterprise network 20. The relay 26 can push messages from the enterprise network 20 to the mobile device 11 via the PLMN 50.

As is typical in many enterprises, the enterprise network 20 can include a Private Branch eXchange (although in various implementations the PBX can be a standard PBX or an Internet Protocol (IP)-PBX, for simplicity the description herein uses the term PBX to refer to both) 16 having a connection with the PSTN 40 or PLMN 50 for routing incoming and outgoing voice calls for the enterprise. The PBX 16 can be connected to the PSTN 40 or PLMN 50 via DID trunks or PRI trunks, for example. The PBX 16 can use Integrated Services Digital Network (ISDN) signaling protocols for setting up and tearing down circuit-switched connections through the PSTN 40 or PLMN 50 and related signaling and communications. In some implementations, the PBX 16 can be connected to one or more conventional analog telephones 19. The PBX 16 can be connected to the enterprise network 20 and, through it, to telephone terminal devices, such as digital telephone sets 17, softphones operating on computers 15, etc. Within the enterprise, each individual can have an associated extension number, sometimes referred to as a PNP (private numbering plan), or direct dial phone number. Calls outgoing from the PBX 16 to the PSTN 40 or PLMN 50 or incoming from the PSTN 40 or PLMN 50 to the PBX 16 can be circuit-switched calls. Within the enterprise, e.g. between the PBX 16 and terminal devices, voice calls can be packet-switched calls, for example Voice-over-IP (VoIP) calls.

The enterprise network 20 can further include a Service Management Platform (SMP) 18 for performing some aspects of messaging or session control, like call control and advanced call processing features. The SMP 18 can, in some cases, also perform some media handling. Collectively the SMP 18 and PBX 16 can be referred to as the enterprise communications platform, generally designated 14. It will be appreciated that the enterprise communications platform 14 and, in particular, the SMP 18, can be implemented on one or more servers having suitable communications interfaces for connecting to and communicating with the PBX 16 and/or DID/PRI trunks. Although the SMP 18 can be implemented on a stand-alone server, it will be appreciated that it can be implemented into an existing control agent/server as a logical software component. As will be described below, the SMP 18 can be implemented as a multi-layer platform.

The enterprise network 20 can include an enterprise server 12. Together with the relay 26, the enterprise server 12 can function to connect the SMP 18 with the device over the packet switched network so that commands and response can be exchanged between an application on the SMP 18 and a corresponding application on the mobile device 11.

The enterprise communications platform 14 can implement the switching to connect session legs and can provide the conversion between, for example, a circuit-switched call and a VoIP call, or to connect legs of other media sessions. In some implementations, in the context of voice calls the enterprise communications platform 14 can provide a number of additional functions including automated attendant, interactive voice response, call forwarding, voice mail, etc. It can implement certain usage restrictions on enterprise users, such as blocking international calls or 1-900 calls. In many implementations, Session Initiation Protocol (SIP) can be used to set-up, manage, and terminate media sessions for voice calls. Other protocols can be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as are known to those of skill in the art and may be described in greater detail below.

One of the functions of the enterprise communications platform 14 can be to extend the features of enterprise telephony to the mobile devices 11. For example, the enterprise communications platform 14 can allow the mobile device 11 to perform functions akin to those normally available on a standard office telephone, such as the digital telephone set 17 or analog telephone set 15. Example features can include direct extension dialing, enterprise voice mail, conferencing, call transfer, call park, etc.

Figure 2:
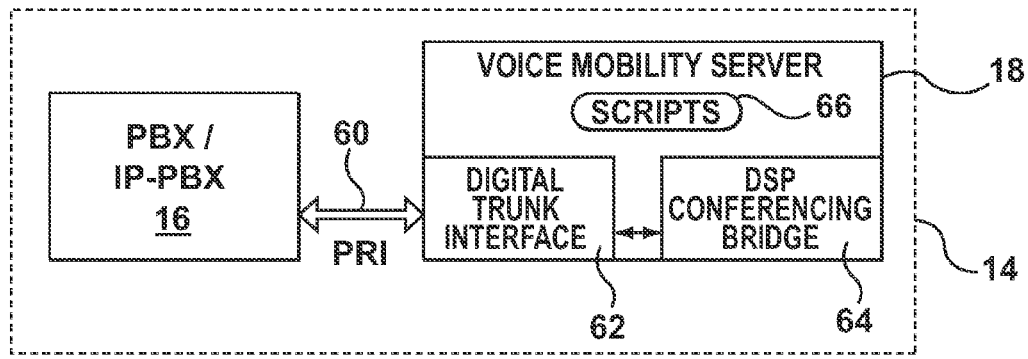
FIG. 2 is a block diagram of the enterprise communications platform in accordance with an exemplary implementation.
Figure 3:
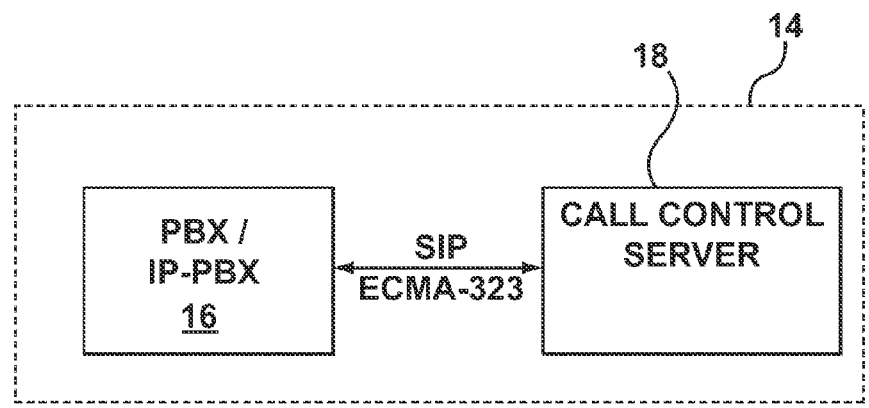
FIG. 3 is a block diagram of an alternate enterprise communications platform in accordance with an exemplary implementation.
Figure 4:
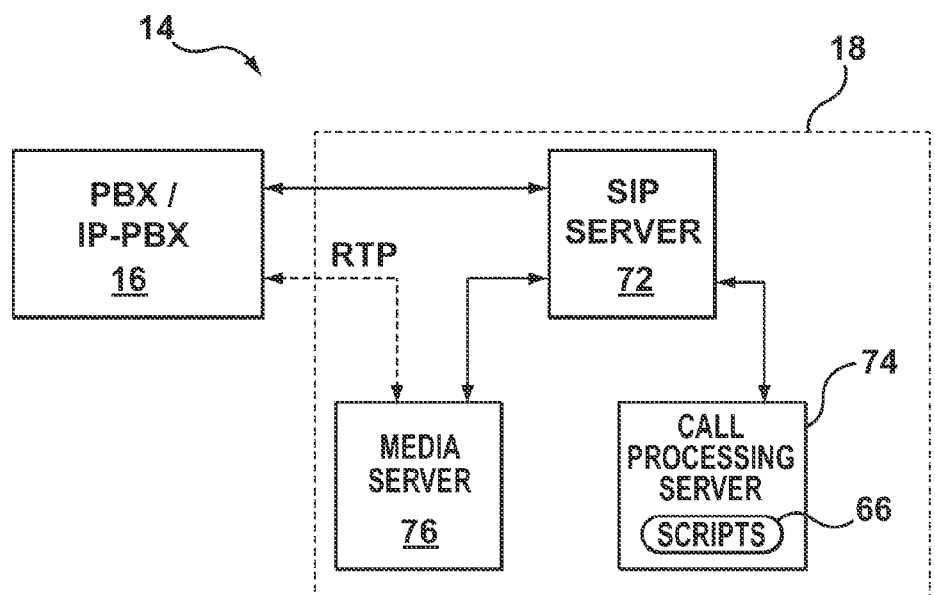
FIG. 4 is a block diagram of another alternate enterprise communications platform in accordance with an exemplary implementation.

Reference is now made to FIGS. 2 to 4, which show example implementations of the enterprise communications system 14. Again, although references are made below to "calls" or call-centric features it will be appreciated that the architectures and systems depicted and described can be applicable to session-based communications in general and, in some instances, to messaging-based communications.

FIG. 2 illustrates an implementation intended for use in a circuit-switched TDM context. The PBX 16 can be coupled to the SMP 18 via PRI connection 60 or other suitable digital trunk. In some implementations, the PRI connection 60 can include a first PRI connection, a second PRI connection, and a channel service unit (CSU), wherein the CSU is a mechanism for connecting computing devices to digital mediums in a manner that allows for the retiming and regeneration of incoming signals. It will be appreciated that there can be additional or alternative connections between the PBX 16 and the SMP 18.

In this implementation, the SMP 18 can assume control over both call processing and the media itself. This architecture can be referred to as "First Party Call Control." Many of the media handling functions normally implemented by the PBX 16 can be handled by the SMP 18 in this architecture. Incoming calls addressed to any extension or direct dial number within the enterprise, for example, can be first routed to the SMP 18. Thereafter, a call leg can be established from the SMP 18 to the called party within the enterprise, and the two legs are bridged. Accordingly, the SMP 18 can include a digital trunk interface 62 and a digital signal processing (DSP) conferencing bridge 64. The DSP conferencing bridge 64 can perform the bridging of calls for implementation of various call features, such as conferencing, call transfer, etc. The digital trunk interface 62 can be implemented as a plurality of telephonic cards, e.g. Intel Dialogic cards, interconnected by a bus and operating under the control of a processor. The digital trunk interface 62 can be partly implemented using a processor module such as, for example, a Host Media Processing (HMP) processor.

The SMP 18 can include various scripts 66 for managing call processing. The scripts 66 can be implemented as software modules, routines, functions, etc., stored in non-volatile memory and executed by the processor of the SMP 18. The scripts 66 can implement call flow logic, business logic, user preferences, call service processes, and various feature applications.

FIG. 3 shows another implementation in which the PBX 16 can perform the functions of terminating and/or bridging media streams, but call control functions can be handled by the SMP 18. In this implementation, the SMP 18 can be referred to as a call control server 18. This architecture can be referred to as "Third-Party Call Control".

The call control server 18 can be coupled to the PBX 16, for example through the LAN, enabling packet-based communications and, more specifically, IP-based communications. In one implementation, communications between the PBX 16 and the call control server 18 can be carried out in accordance with SIP. In other words, the call control server 18 can use SIP-based communications to manage the set up, tear down, and control of media handled by the PBX 16. In one example implementation, the call control server 18 can employ a communications protocol conforming to the ECMA-269 or ECMA-323 standards for Computer Supported Telecommunications Applications (CSTA).

FIG. 4 shows yet another implementation of the enterprise communications system 14. This implementation reflects the adaptation of an existing set of call processing scripts to an architecture that relies on third-party call control, with separate call control and media handling. The SMP 18 can include a call processing server 74. The call processing server 74 can include the scripts 66 or other programming constructs for performing call handling functions. The SMP 18 can include a SIP server 72 and a media server 76. The separate SIP server 72 and media server 76 can logically separate the call control from media handling. The SIP server 72 can interact with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 can interact with the media server 76 using SIP-based media handling commands. For example, the SIP server 72 and media server 76 can communicate using Media Server Markup Language (MSML) as defined in IETF document Saleem A., "Media Server Markup Language", Internet Draft, draft-saleem-msml-07, Aug. 7, 2008. The media server 76 can be configured to perform Host Media Processing (HMP). Other architectures or configurations for the enterprise communications system 14 can be appreciated by those of ordinarily skilled in the art.

Figure 5:
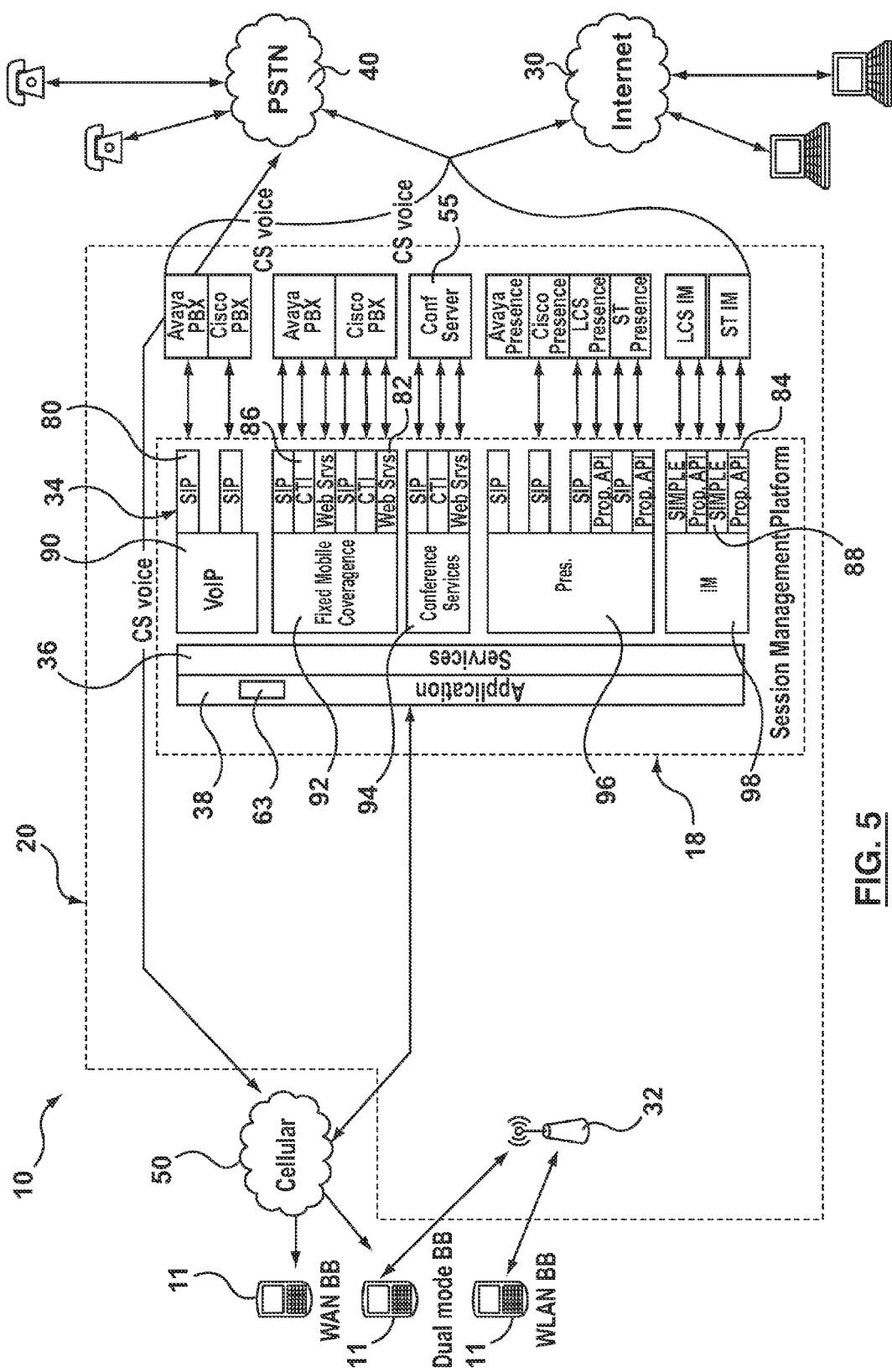
FIG. 5 is a more detailed block diagram of the enterprise communications platform of FIG. 3, in accordance with an exemplary implementation.

Reference is now made to FIG. 5, which shows an implementation of the enterprise communications system 14 with a Third Party Call Control architecture. In this implementation, the SMP 18 can be a multi-layer platform that includes a protocol layer 34, a services layer 36 and an application layer 38. The protocol layer 34 can include a plurality of interfaces operating in accordance with various protocols, each interface can be configured for enabling operation of corresponding applications in the application layer 38. The services layer 36 can include a plurality of services that can be leveraged by the interface protocols to create richer applications. Finally, the application layer 38 can include a plurality of applications that are exposed out to the communication devices and that leverage corresponding ones of the services and interface protocols for enabling the applications.

Specifically, the protocol layer 34 can preferable include protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 can be plug-ins that interface directly with corresponding servers in the enterprise network 20, which are further described below.

For the purposes of this disclosure, SIP 80 can be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 can provide for two interfaces for signaling: SIP-Trunk (hereinafter referred to as "SIP-T") and SIP-Line (hereinafter referred to as "SIP-L"). The SIP-T interface can be utilized when the endpoint is a non-specific entity or not registered (i.e., when communicating between two network entities). In contrast, the SIP-L interface can be utilized when the endpoint is registered (i.e., when dialing to a specific extension). The specific operation of the system 10 can utilize SIP 80 which is described in further detail below.

The SMP 18 can include a plurality of enablers, among other things, a VoIP enabler 90, a Fixed Mobile Convergence or FMC enabler 92, a conference services enabler 94, a presence enabler 96, an Instant Messaging or IM enabler 98, and a mobility-over-cellular enabler (not shown). Each of the enablers can be used by corresponding services in the services layer 36 that combine one or more of the enablers. Each of the applications in the application layer 38 can then be combined with one or more of the services to perform the desired application. For example, a phone call service can use the FMC, VoIP or Mobility-over-Cellular enabler, and an emergency response application can use the phone call service, an Instant Messenger service, a video call service, and email service and/or a conference service.

To allow a company having an enterprise phone system to control how its employees use the enterprise phone system, user profiles can be implemented. In the enterprise phone system, one employee can be assigned one telephone number that is associated with at least one work device, e.g., work phone device, and at least one mobile device, e.g., PDA, or a separate number can be assigned to each device. Each device can have one or more lines associated with the device, each line representing a unique persona. For example, the mobile device can have a regular cellular line and also a work line provided by a FMC, VoIP or Mobility-over-cellular enabler. When the user makes a call on the cellular line, or receives a call on the cellular number corresponding to the cellular line, the user can present a specific persona that is distinct from when the user makes a call on the work line or receives a call on the work number corresponding to the work line. To assist in the setting up and management of the user profiles, one or more class of service (COS) can be used. The COS can allow an administrator to globally set rules or rule sets for each COS with each rule being modifiable by the administrator. For example, an employee in the management COS can have different rules being applied to the employee's calls, e.g., permitting calls overseas, compared to the rules being applied to the staff COS, e.g., not permitting calls overseas. As well as a COS, there can be one or more rules that are specific to an individual user set by the administrator and can be, in some cases, modifiable by the user. For example, the list of callers who are considered to be important or the list of callers who should be blocked can be modifiable by the user. Included in the COS, the individual user rules, or a combination thereof, there can be rules that control the selection of a line, for an FMC line, rules that control the selection of the transport (VoIP or Mobility-over-Cellular), rules to control when lines can be used by time and day, etc. These rules, both from the COS and individual rules, make up a rule set. Depending on how the rule sets are setup, some rule sets can be overridden by other rule sets or individual rules within a rule set can be overridden by a corresponding rule in a different rule set. A complete rule set is known as a Line and Call Control Policy.

At a minimum, each employee can have a Default Line and Call Control Policy. Depending on the COS for the employee, the employee can have an Additional Line and Call Control Policies, for example, the Default Line and Call Control Policy can define the behavior of the device for work calls, while a user specified Private Additional Line and Call Control Policy can define the rule set for private calls, or as another example, the user can define an Out of Hours Additional Line and Call Control Policy that can define how calls are handled while outside normal office hours. Each Line and Call Control Policy can include the type of rule set, the rule set, and an override. The type of rule set can be the name of the rule set, the rule set can include the available options, and the override can determine if the rule set can be overridden. If the Default Line and Call Control Policy allows for a rule to be overridden, the applicable rule in the Additional Line and Call Control Policy can override the rule. A Line and Call Control Policy for an FMC line can include, for example, the following types: line selection criteria, transport selection criteria, WLAN profiles that are allowed to be used for VoIP calls, direction of the cellular call establishment for Mobility-over-Cellular, time of day control over when a call is sent from the enterprise to the FMC line on the mobile device, and caller restrictions such as allowed lists, blocked lists, handling of unknown caller identify, etc. In one or more implementations, more or less types can be implemented.

The line preference controls which or how the lines are used. The line preference typically consists of two lines, a work line (VoIP, Mobility-over-Cellular or FMC) and a mobile line. In other implementations, more than two lines can be used, for example, a third line provided by a VoIP carrier such as Skype or GoogleTalk or through Alternative Line Service. The line preference can control when the work line or mobile line is the default line and how to handle a call when the default line is unavailable. Exemplary line preference options are Work Line Preferred (Mobile Auto), Work Line Preferred (Mobile Prompt), Work Line Only, and Mobile Preferred. In the Work Line Preferred (Mobile Auto) mode, the work line is the default line. If the work line is not available, then the call can be automatically placed directly over the cellular line. In the Work Line Preferred (Mobile Prompt) mode, the work line is the default line. If the work line is unavailable, then the call can be placed over the cellular line only after prompting the user and receiving approval for switching of personas. In the Work Line Only mode, the work line is the default line. If the work line is unavailable then the call fails. Typically, the user cannot change the work line to access other lines or personas. This mode would be used, for example, if the mobile device is provided by the enterprise and all calls on that device need to be recorded by the enterprise. In the Mobile Preferred mode, the mobile line can be the default line. Typically, for the options that express a preference, the user can change the preference line to a different line, although this behavior can be explicitly disallowed by the administrator in the Class of Service.

The transport preference can control which transport is the preferred transport if two or more transports are available, for example, in the case of an FMC line where the call can be established over VoIP or over Mobility-over-Cellular, If several VoIP options exist, for example, VoIP over Cellular, VoIP over WLAN 802.11 or VoIP over WiMAX 802.16, this option can control the selection of the VoIP transport. In an exemplary implementation, both the Mobility-over-Cellular transport and the VoWLAN transport can be available to the work line. In the Mobility-over-Cellular Preferred mode, the Mobility-over-Cellular line can be preferred and the VoWLAN transport can only be used if the Mobility-over-Cellular transport is unavailable. In the VoWLAN Preferred mode, the VoWLAN transport is preferred whenever it is available. In the Mobility-over-Cellular Only mode, the VoWLAN transport is never available to the user and as a result all calls go over the Mobility-over-Cellular transport. In the VoWLAN Preferred mode, the Mobility-over-Cellular transport is never available to the user and so all calls go over the VoWLAN transport.

The WLAN preference can control which transport, e.g., VoWLAN, is enabled by controlling which WLAN Profiles support the voice transport. A WLAN profile can include the details stored on the device that identifies a specific WLAN network or hotspot such as the BSSID, security secrets, etc. A WLAN Profile can be added by the enterprise using an IT Policy (Enterprise WLAN Profile), or can be configured by the user (Private WLAN Profile). Thus the transport rules can define which WLAN Profiles are allowed to be used for VoWLAN, and whether the user can add VoWLAN to the Private WLAN Profiles. A user can have multiple Private WLAN Profiles, e.g., work, home, Starbucks.

The direction preference controls how incoming and outgoing calls can be made via the mobile device using Mobility-over-Cellular. For example, a Mobility-over-Cellular call can be established by the enterprise calling the mobile number, or the mobile device calling a pre-defined enterprise number. The direction can be based on the location of the mobile device, e.g., in the home PLMN or in a visiting PLMN, on geographical location of the enterprise-provides gateways from the PSTN, as well as whether the network for the mobile device is capable of receiving data. For example, an enterprise can have a preferential rate with a cellular carrier that results in calls from the mobile into the enterprise being substantially cheaper than calls set up in the other direction. However, these rates may not apply if the device is roaming internationally, in which case the call is less expensive if the mobile is called from the enterprise. Another example can be where the enterprise has a PSTN gateway located in two countries, and so the cellular call cost can be reduced by calling into the local gateway for a roaming device rather than being called by the enterprise.

The Time of Day preferences can filter both incoming and outgoing calls based on the time of day. Incoming call filtering can consist of whether the call is allowed to be extended to the mobile device, while outgoing filtering selects whether the call is made over the work line or cellular line. The time of day can be broken into the individual week days, Monday through to Sunday, and twenty four hours a day, as well as other increments. This rule can combine with the line preference rule. Thus, the line preference can be set to work line, but the time of day outgoing rule overrides the line preference for outgoing calls being made before work hours, e.g., 8 AM and after 5 PM Monday to Friday, and all calls on Saturday and Sunday. The time of day can be set by the administrator and applied in the time zone of the user's home office. Thus, in the COS, the administrator can set the rules described above, then 8 to 5 work hours can be applied using the time zone of the user's home office. Other administration rules can allow for the user to override the times set by the administrator, and also vary depending on the time zone of the device compared to the time zone of the user's regular office.

The Call Number Filtering preferences can filter incoming calls extended to the mobile device. This filtering can occur before the time of day filtering occurs. The filtering can include allowed list, blocked list, and unknown caller. The al lowed list can include numbers that are always forwarded to the mobile device. The blocked list can include numbers that are not forwarded (or blocked from being forwarded) to the mobile device. The unknown caller can be a Boolean option on whether calls that do not have caller identification are forwarded to the mobile device.

Referring to FIG. 6, a Default Line and Call Control Policy in accordance with an exemplary implementation is illustrated. This Default Line and Call Control Policy or "Default" user profile can be for an "employee" COS and defines the capabilities allocated to each employee in a company. For example, for each employee, the work line is preferred during working hours but the second line after hours, allows VoW-LAN calls only on the enterprise's WLAN network, has no blocked or allowed numbers and wishes that PBX mobility calls are established as mobile initiated.

Referring to FIG. 7, a Private Additional Line and Call Control Policy in accordance with an exemplary implementation is illustrated. The Private Additional Line and Call Control Policy or "Private" user profile can override specific aspects of the Default Line and Call Control Policy. This can provide for fine control of dual-persona management—contacts control how calls are made and received. The administrator can define the Private user profile with the rule sets that can override the rules sets of the Default user profile. Thus, for example, using the Default user profile, the administrator can realize that there can be times where the user wishes not to use his work line. For example, if a worker is calling a spouse or is making a call related to a task in the mobile device, such as, checking the tide times at the local port, the worker can prefer to use the mobile device.

The user profiles can be associated with an item, or the application associated with the item, e.g., the context. For example, an item can be a contact, a calendar event, a task, a note, or a specific web page. One or more rule sets can be associated with the item, or the application associated with the item, with the rule set controlling how a phone call established using information in an attached item can be used. Thus, the user can associate his wife with the Private user profile for example, and all calls to and from his wife go over the second line. For these calls, the user can prefer to use the second line directly. Similarly, "click to call" can also be tied to the Private user profile. For example, if an employee is reading an email from his wife that contains the phone number of a local window cleaner, the employee can click on the phone number in the email and call the window cleaner on the mobile device rather than the work phone device. The call can be made over the mobile device because the contact, the wife, can be associated with the Private user profile. In yet another example, if the employee clicked on a telephone number listed in a web browser, the call would be made based on the rules sets in the Default user profile.

Referring to FIG. 8, an Out of Hours Additional Line and Call Control Policy in accordance with an exemplary implementation is illustrated. The Out of Hours Additional Line and Call Control Policy or "Out of Hours" user profile can be used when the employee needs to use the work line or second line during off hours (outside of the normal work hours). For example, an employee may need to make a work call out of hours, e.g., calling overseas, in response to a pre-arranged meeting. Therefore the user creates the Out of Hours user profile which can override the Time of Day filtering for outgoing calls while leaving all the other rules as is. The user can associate this rule with a specific calendar appointment and when the appointment prompts the user, the call is placed automatically over the first line despite the time of day.

Figure 9:
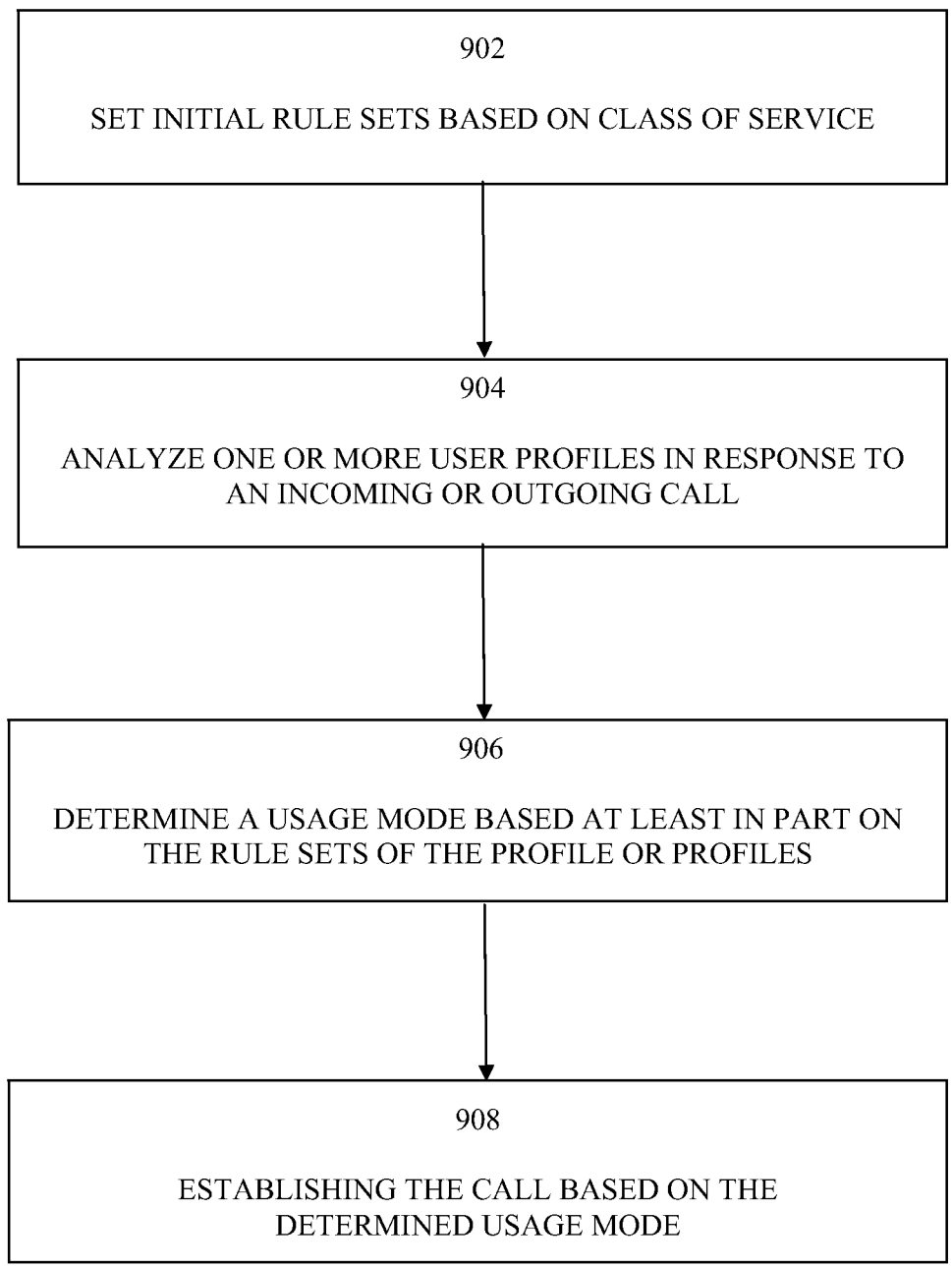
FIG. 9 a flowchart of a method for using a user profile in an enterprise fixed mobile convergence system in accordance with an exemplary implementation.

Referring to FIG. 9, a flowchart of a method for using a user profile in an enterprise fixed mobile convergence system in accordance with an exemplary implementation is illustrated. The exemplary method 900 is provided by way of example, as there are a variety of ways to carry out the method. In one or more implementations, the method 900 can be performed using one or more servers, e.g., enterprise server 12, enterprise communication platform 14, SMP 18, or any other suitable server or servers, or can be pushed down to the devices, e.g., the work phone device (such as the digital telephone 17, laptop or computer 15) or mobile device (such as the mobile device 11). The method 900 can be executed or otherwise performed by one or a combination of various systems. The method 900 described below can be carried out using the communication devices and communication network shown in FIGS. 1-8 by way of example, and various elements of these figures are referenced in explaining exemplary method 900. Each block shown in FIG. 9 represents one or more processes, methods or subroutines carried out in exemplary method 900. The exemplary method 900 may begin at block 902.

At block 902, one or more rule sets are initially set in accordance with a COS. For example, an administrator can set one or more rule sets for at least the Default user profile for each COS. In one or more implementations, the administrator can initially set one or more rule sets of additional user profiles, such as the Private user profile and the Out of Hours user profile. After initially setting the one or more rule sets, the method 900 can proceed to block 904.

At block 904, a user profile associated with a work phone device (e.g., a first device) and a mobile device (e.g., a second device such as a cell phone or PDA) is analyzed in response to an incoming or outgoing call. For example, the work phone device, mobile device, or enterprise server 12, enterprise communication platform 14, SMP 18 of the enterprise fixed mobile convergence system 20, can analyze the user profile or profiles in response to the call. The user profile can be the user profile associated with the work phone device and mobile device that is receiving the call or making the call. In one or more implementations, if the other device (third device), e.g., the non-work phone device or mobile device, that is being called or calling the work phone device or mobile device, is also associated with the same enterprise fixed mobile convergence system, the user profile associated with the user of the third device can also be analyzed. The user profile can be the Default Line & Call Control Policy. In one or more implementations, additional user profiles, such as the Private Additional Line & Call Control Policy, Out of Hours Additional Line & Call Control Policy, or other user profiles can also be analyzed. The number of user profiles can be dependent on the COS that is associated with the user. After analyzing the user profile or profiles, the method 900 can proceed to block 906.

At block 906, a usage mode is determined based on the rule sets of the user profile or profiles. For example, the work phone device, mobile device, or enterprise server 12, enterprise communication platform 14, SMP 18 of the enterprise fixed mobile convergence system 20, can determine the usage mode based on the rule sets of the user profile or profiles. At a minimum, the rules associated with the phone line and transport can be determined. In one or more implementations, other rules sets can also be analyzed to determine the usage mode. For example, the WLAN profile allowance, Direction, Time of Day, Caller Restriction, and context rule sets can be analyzed to the determine the usage mode. After determining the usage mode, the method 900 can proceed to block 908.

At block 908, the call is established. For example, the work phone device, mobile device, or enterprise server 12, enterprise communication platform 14, SMP 18 of the enterprise fixed mobile convergence system 20, can communicatively couple either the work phone device or mobile device to the third device based on the usage mode. For example, using the three user profiles illustrated in FIGS. 6-8, if a call is made to a number in the enterprise fixed mobile convergence system during normal business hours on a weekday, the call would go to the work phone device and if the work phone device is not answered, the call would be sent to the mobile device which would prompt the user whether to answer the call or not.

In an another example, the three user profiles, Default, Private and Out of Flours, can be pushed down to the devices associated with the user as part of the COS. The user profiles can be displayed on the device, e.g., work phone device or mobile device, in the phone options menu. As illustrated in FIG. 6, in normal operation, only the default user profile is used, so that during office hours, all calls go over the work line, VoWLAN, if the user is in the office and to the mobile line, PBX Mobility, if the user is not in the office. If the user has a list of contacts having associated telephone numbers, calls to the user's friends can be made over the mobile line directly and avoid going through the enterprise. In this scenario, the Private user profile associates the Private user profile to the contact directly. Thus, if the user tries to call his wife, since the spouse's contact information specifies the Private user profile, then the call is made using the mobile line. For incoming calls that go directly to the mobile line, the enterprise should block all the calls unless the caller is in the contact list of the user associated with the mobile device.

In yet another example, if there is a work call to be made out of hours, e.g., a conference call to a colleague on the west coast with the mobile device being on the east coast. The Out of Hours user profile can be used to arrange the call. The list of contacts associated with the mobile device can associate the colleague to the Default user profile and the meeting appointment can associate the meeting appointment to the Out of Hours user profile. So, for example, if an employee has scheduled a conference call for 8 PM local time, the call can be made directly from the appointment or reminder with the Out of Hours user profile controlling the call. In such an implementation, the call can be controlled by one or more rule sets associated with the context of the call, e.g., the contact, the appointment, and the time.

The present technology can take the form of hardware, software or both hardware and software elements. In some implementations, the technology is implemented in software, which includes but is not limited to firmware, resident software, microcode, a Field Programmable Gate Array (FPGA) or an Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

What is claimed is:

1. A computer program product for a device in a fixed mobile convergence system, the computer program product comprising:
   at least one computer readable medium; and
   at least one program module, stored on the at least one computer readable medium and operative, upon execution by at least one processor for:
   analyzing at least one rule set associated with at least one user profile, the user profile associated with at least one mobile device supporting more than one line, each line offering one or more transports and options for establishing a telephone call to or from one of the devices, with the options for establishing the telephone call includes at least one call direction rule set which dictates that the fixed mobile convergence system calls the mobile device for incoming calls on a home public land mobile network (PLMN), the fixed mobile convergence system calls the mobile device for incoming calls on a visiting PLMN, the mobile device calls a pre-determined number associated with the fixed mobile convergence system on the home PLMN for an outgoing call and in response the fixed mobile convergence system calls the mobile device on the home PLMN, and the mobile device calls a pre-determined number associated with the fixed mobile convergence system on the visiting PLMN for an outgoing call and in response the fixed mobile convergence system calls the mobile device on the visiting PLMN;

determining a context-specific real-time usage mode based on the analysis which includes selections of a telephone line, a transport and establishment options; and establishing a call between the mobile device and a telephony endpoint, either incoming or outgoing, based on the determined usage mode.

2. The computer program product of claim 1 wherein upon execution by at least one processor setting the initial rule sets for each user based on class of service.

3. The computer program product of claim 1 wherein analyzing at least one rule set associated with at least one user profile comprises analyzing at least one rule set including call direction with the fixed mobile convergence system calling the mobile device in the event the mobile device is located within a visiting PLMN.

4. A mobile device comprising:
at least one processor;
at least one computer readable medium in communication with the processor; and
at least one program module stored on the at least one medium, and operative upon execution by the processor for:
analyzing at least one rule set associated with at least one user profile, the user profile associated with the mobile device supporting more than one line, each line offering one or more transports and options for establishing a telephone call to or from the device with the options for establishing the telephone call includes at least one call direction rule set which dictates that the fixed mobile convergence system calls the mobile device for incoming calls on a home public land mobile network (PLMN), the fixed mobile convergence system calls the mobile device for incoming calls on a visiting PLMN, the mobile device calls a pre-determined number associated with the fixed mobile convergence system on the home PLMN for an outgoing call and in response the fixed mobile convergence system calls the mobile device on the home PLMN, and the mobile device calls a pre-determined number associated with the fixed mobile convergence system on the visiting PLMN for an outgoing call and in response the fixed mobile convergence system calls the mobile device on the visiting PLMN;

determining a context-specific real-time usage mode based on the analysis which include selections of a telephone line, a transport and establishment options; and establishing a call between the device and a telephony endpoint, either incoming or outgoing, based on the determined usage mode.

5. The mobile device of claim 4 wherein upon execution by at least one processor setting the initial rule sets for each user based on class of service.

6. The mobile device of claim 4 wherein analyzing at least one rule set associated with at least one user profile comprises analyzing at least one rule set including call direction with the fixed mobile convergence system calling the mobile device in the event the mobile device is located within a visiting PLMN.

7. A method for a fixed mobile convergence system, the method comprising:
analyzing at least one rule set associated with at least one user profile, the user profile associated with at least one mobile device supporting more than one line, each line offering one or more transports and options for establishing a telephone call to or from the device with the options for establishing the telephone call includes at least one call direction rule set which dictates that the fixed mobile convergence system calls the mobile device for incoming calls on a home public land mobile network (PLMN), the fixed mobile convergence system calls the mobile device for incoming calls on a visiting PLMN, the mobile device calls a pre-determined number associated with the fixed mobile convergence system on the home PLMN for an outgoing call and in response the fixed mobile convergence system calls the mobile device on the home PLMN, and the mobile device calls a pre-determined number associated with the fixed mobile convergence system on the visiting PLMN for an outgoing call and in response the fixed mobile convergence system calls the mobile device on the visiting PLMN;

determining a context-specific real-time usage mode based on the analysis which includes selections of a telephone line, a transport and establishment options; and establishing a call between the mobile device and a telephony endpoint, either incoming or outgoing, based on the determined usage mode.

8. The method of claim 7 wherein one of the offered transports is a fixed transport comprising at least one of a public switch telephone network (PSTN) and voice over wireless local area network (VoWLAN).

9. The method of claim 7 wherein one of the offered transports is a mobile transport comprising at least one of a private branch exchange mobility (PBX Mobility) and public land mobile network (PLMN).

10. The method of claim 7 wherein analyzing at least one rule set associated with at least one user profile further comprises analyzing at least one rule set selected from call scheduling, call restrictions, and WLAN profile control.

11. The method of claim 10 wherein the call direction is based on a location of the mobile device with the location being one of within a home PLMN and a visiting PLMN.

12. The method of claim 10 wherein the call scheduling rule sets dictate a line, transport, and voicemail used during weekdays, weekends, work hours, and non-work hours.

13. The method of claim 10 wherein the call restriction rule sets dictate caller filtering based on allowed callers, blocked callers and unknown callers based on a list of contacts associated with the user profile.

14. The method of claim 10 wherein the WLAN profile control rule sets dictate the transport and line that is used based on a WLAN profile associated with the location of the mobile device.

15. The method of claim 7 wherein the user profile includes one or more rule sets selected from the group consisting of a default line and call control policy, private additional line and call control policy, and out of hours additional line and call control policy and time of a call dictates which rule set controls.

16. The method of claim 15 wherein one or more rule sets in the default line and control policy include a parameter allowing for one or more rule set to be overridden.

17. The method of claim 7 wherein analyzing at least one rule set associated with at least one user profile further comprises analyzing at least one rule set from a user profile associated with a another device which is calling or being called by either the work phone device or the mobile device.

18. The method of claim 7 further comprising setting the initial rule sets for each user based on a class of service.

19. The method of claim 7 wherein analyzing at least one rule set associated with at least one user profile comprises analyzing at least one rule set including call direction with the fixed mobile convergence system calling the mobile device in the event the mobile device is located within a visiting PLMN.

* * * * *